United States Patent [19]

Takahashi et al.

[11] Patent Number: 4,984,813
[45] Date of Patent: Jan. 15, 1991

[54] SHOPPING PUSHCART

[75] Inventors: Takehiko Takahashi; Hideo Saito; Takashi Watanabe; Tomihioro Kaneko, all of Tokyo, Japan

[73] Assignee: Combi Co., Ltd., Tokyo, Japan

[21] Appl. No.: 378,948

[22] Filed: Jul. 12, 1989

[30] Foreign Application Priority Data

Jul. 13, 1988 [JP] Japan .............................. 63-92804[U]

[51] Int. Cl.⁵ .............................................. B62B 7/12
[52] U.S. Cl. ..................................... 280/30; 220/212;
280/47.38; 280/643; 280/644; 280/648;
297/DIG. 4
[58] Field of Search ...................... 280/658, 650, 47.38,
280/30, 648, 644, 643, 642, 47.4; 220/1 V, 212;
297/1, 2, 3, 118, 129, 283, DIG. 4

[56] References Cited

U.S. PATENT DOCUMENTS 1,429,368  9/1922  Owler et al. .......................... 297/283
3,930,662  1/1976  Manner .................. 280/650
4,674,631  6/1987  Williams .............................. 297/129
4,889,257 12/1989  Steffes .................... 220/212

FOREIGN PATENT DOCUMENTS 374387   8/1922  Fed. Rep. of Germany ...... 297/283
2026112 11/1977  Fed. Rep. of Germany ...... 297/118

Primary Examiner—Charles A. Marmor
Assistant Examiner—Eric Culbreth
Attorney, Agent, or Firm—Sughrue, Mion, Zinn, Macpeak & Seas

[57] ABSTRACT

A shopping pushcart includes an article-holding container mounted inwardly of a frame and having an open top. A lid plate is mounted through a link above the open top of the article-holding container in such a manner that the lid plate can be moved to a generally upstanding position and can also be reversed. Opposite faces of the lid plate serve as a lid surface and a seat surface, respectively.

4 Claims, 6 Drawing Sheets

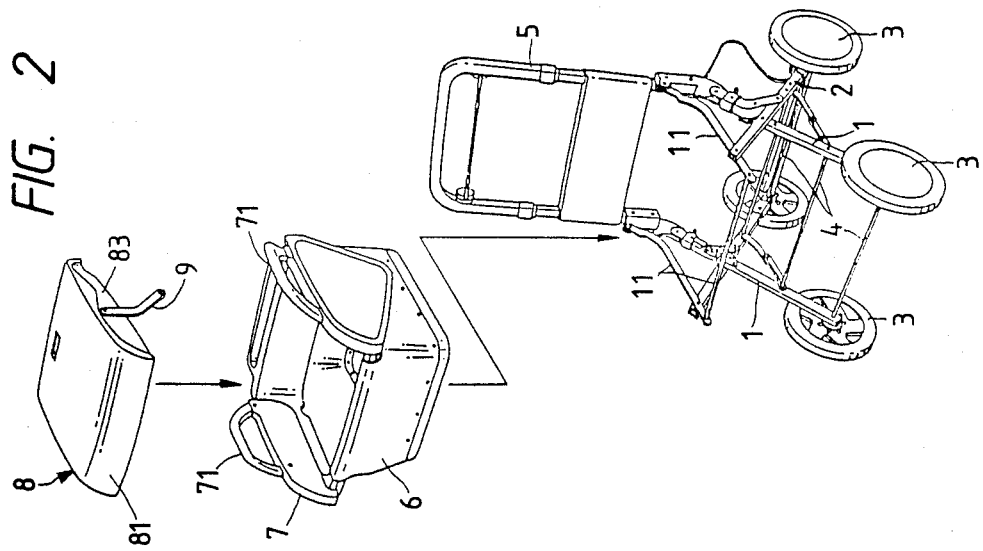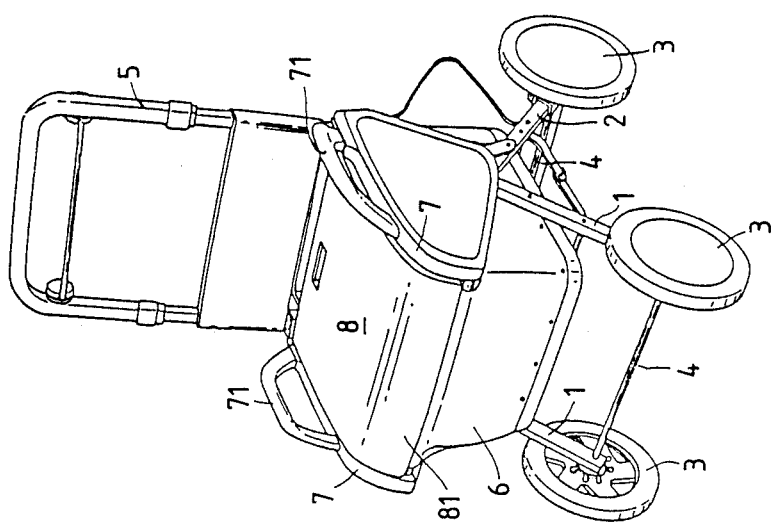

SHOPPING PUSHCART

BACKGROUND OF THE INVENTION

1. Field of the Invention

This invention relates to a shopping pushcart which can be used as a supportive device for helping those who have difficulty in walking such as the aged and the physically handicapped having weak legs, and can also be used as a chair for the purpose of resting from walking.

2. Prior Art

One of the typical physical handicaps from which man is liable to suffer as he gets older is difficulty in walking. At an initial stage of such walking difficulty, one merely finds it a little hard to walk carrying baggage or the like. When ones ability to walk is further reduced, one finds it very difficult to walk carrying baggage or when walking on a downward slope. In such case, one needs either a helper or a walking supportive device.

Even if those who have a little difficulty in walking can walk with the aid of a walking supportive device, it is impossible for them to walk a long distance without stopping for rest. Therefore, in such cases, they need a place for resting or a supportive device for enabling them to rest.

To deal with the above problem a shopping pushcart as disclosed in Japanese Utility Model Publication No. 16770/82 has been proposed. This conventional shopping pushcart comprises a walking supportive cart including a handle grip, and a basketlike article-holding container for holding purchased goods, etc. A lid of a rigid construction is provided for closing an open top of the basket-like article-holding container. In use one who has difficulty in walking grips the handle grip when walking. Thus, the pushcart serves as a walking supportiVe device. Also, when such a person wishes to rest, he can sit on the lid covering the open top of the basket-like article-holding container.

The above conventional pushcart has been found not satisfactory, however in that the upper surface of the lid serving as a seat is always exposed and therefore is liable to become dirty or soiled by rain, dirt, etc. This is particularly the case when the pushcart is left outdoors when not being used. The next time the user uses the pushcart and needs to sit down, he will have to sit on a dirty seat.

Another difficulty with the above conventional pushcart is that since the lid is always exposed above the top of the article-holding container this detracts from the appearance, and at a glance it can be realized that such pushcart can serve as a walking supportive device. Therefore, there is a tendency that those who are healthy are reluctant to use such a pushcart.

SUMMARY OF THE INVENTION

With the above deficiencies of the prior art in view, it is an object of this invention to provide a shopping pushcart which has a seat surface which can always be kept clean, and is not different in appearance from an ordinary shopping pushcart.

According to the present invention, there is provided a shopping pushcart comprising a frame constituting a body of the pushcart; an articleholding container mounted inwardly of the frame and having an open top; and a lid plate mounted through a link means above the open top of the article-holding container in such a manner that the lid plate can be moved to a generally upstanding position and can also be reversed, opposite faces of the lid plate serving as a lid surface and a seat surface respectively.

BRIEF DESCRIPTION OF THE DRAWINGS

FIG. 1 is a perspective view of a shopping pushcart provided in accordance with the present invention, showing a lid plate in its normal or closed condition to serve as a lid;

FIG. 2 is an exploded perspective view of the pushcart;

DESCRIPTION OF THE PREFERRED EMBODIMENT OF THE INVENTION

Figure 4:
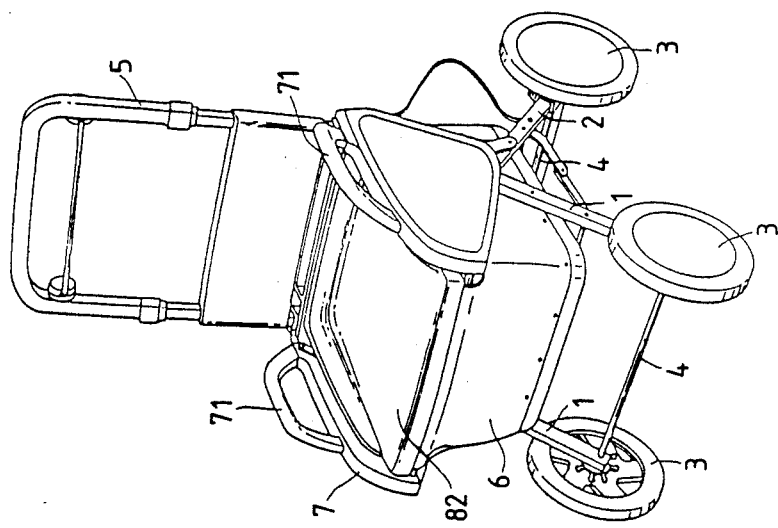
FIG. 4 is a view similar to FIG. 1, but showing the lid plate in its reversed condition to provide a seat.
Figure 3:
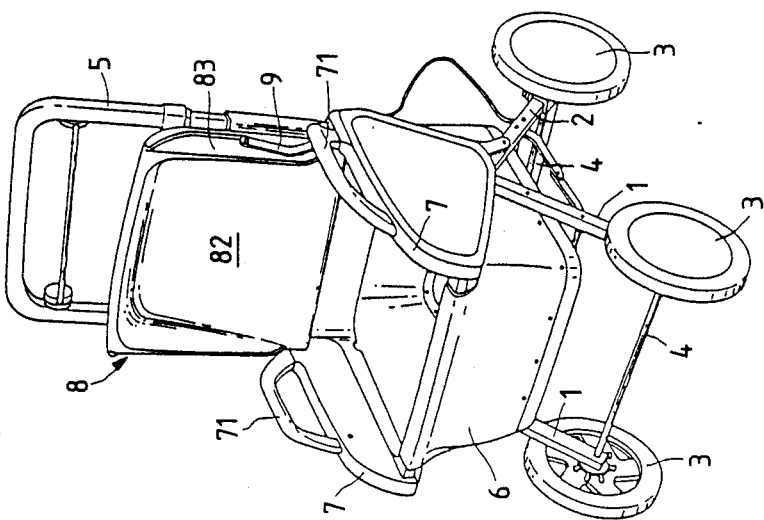
FIG. 3 is a view similar to FIG. 1 but showing the lid plate in its upstanding position for introducing goods into an article-holding container.

The invention will now be described with reference to the drawings.

A shopping pushcart comprises a pair of front legs 1 and 1 and a pair of rear legs 2 each connected to a respective one of the front legs in an X-shape so that each mating front and rear leg 1 and 2 can be folded. Connecting bars 4 extend between the pair of front legs 1 and 1 and also between the pair of rear legs 2. Wheels 3 are mounted on the lower ends of the front and rear legs 1 and 2, respectively. A handle grip or bar 5 is connected to the upper ends of the front legs 1 and 1 in a foldable manner. U-shaped member 11 is connected to the upper ends of the two front legs 1 and 1 and the two rear legs 2. Thus, the frame or body of the pushcart is formed by the above component parts.

An article-holding container 6 is arranged in a suspended manner and is disposed inwardly of the frame including the front legs 1 and 1, the rear legs 2 and the U-shaped member 11. The article-holding container 6 has a bag-like shape having a square bottom, and the upper peripheral portion of the container 6 defining an upper opening is fixedly connected to a peripheral portion of a U-shaped seat frame 7 connected to the upper ends of the front legs 1 and 1 and the upper ends of the rear edges 2.

The shape of the article-holding container 6 is not particularly limited, and the container 6 can be formed in such a manner that it extends rearwardly from the rear of the pushcart through a rear open portion of the U-shaped member 11 to an extent not to interfere with the walking of the user, thus increasing the capacity of the container 6.

The U-shaped seat frame 7 to which the upper peripheral portion of the article-holding container 6 is secured, is made of a material having a suitable degree of rigidity, such as a synthetic resin. The U-shaped seat frame 7 has a pair of opposed side walls and a base wall interconnecting the side walls and the U-shaped seat frame 7 has a suitable height that a lid plate 8 can be fitted in the U-shaped seat frame 7. A pair of handgrips 71 and 71 are secured to the upper edges of the side walls of the seat frame 7, respectively and the upper edges of these side walls serve as armrests.

The handgrips 71 and 71 serve to help the user to stand up from the lid plate 8 when the user wishes to do so after sitting. A user can grip the handgrips 71 and 71 with his hands to support his body so that he can stand up easily.

The opposed side walls of the seat frame 7 serve as the optimum armrests when the user sits on a seat surface 82 (which is defined by the reverse face of the lid plate 8 as later described). To achieve this, the distance between the seat surface 82 and the upper end of each side wall is suitably determined.

The lower end of the seat frame 7 is fixedly secured by rivets or the like to the U-shaped member 11 connected to the upper ends of the front legs 1 and the rear legs 2.

The lid plate 8 is mounted inwardly of the seat frame 7 in such a manner that the lid plate 8 is movable between a lower closed position and an upstanding open position and also can be reversed. One face or side of the lid plate 8 serves as a lid surface 81 for closing the open top of the article-holding container 6 while the other face serves as the seat surface 82 on which the user can sit.

The upper face of the lid plate 8, serving as the lid surface 81, is of such a size that it can close the open top of the article-holding container 6. The lid surface 81 when viewed from the side thereof, corresponds in contour to the seat frame 7 (see FIGS. 1, 2 and 5). The reverse face of the lid plate 8 opposite to the lid surface 81 serves as the seat surface 82. The seat surface 82 is recessed except for its peripheral portion and is curved upwardly toward its rear end, thus providing a suitable seat for the user. The seat surface 82 has a generally L-shaped cross-section (see FIGS. 3 to 7).

A link means includes a pair of links 9 and 9 which are connected respectively on the opposite side walls of the lid plate 8 so as to angularly move and reverse the lid plate 8. Each link 9 is bent at its central portion to assume a generally V-shape and one end of the link 9 is pivotally connected to the side wall of the lid plate 8 while the other end is pivotally connected to the side wall of the seat frame 7 adjacent to its base wall.

The positions of connecting of the links 9 and 9 are not limited to those shown in the illustrated embodiment, and the links 9 and 9 may be connected at any positions so long as the lid plate 8 can be moved between its closed and open (upstanding) positions and be reversed.

Recesses 83 and 83 for receiving the respective links 9 and 9 therein are formed respectively in the outer surfaces of the opposite side walls of the lid plate 8. The depth of the recess 83 corresponds to the thickness of the link 9, and is suitably shaped in agreement with the generally V-shaped link 9. With this arrangement, when the lid surface 81 is in its closed position and also when the seat surface 82 is in its operative position to provide the seat for the user, the links 9 and 9 are optimally received in the recesses 83 and 83, respectively.

The lid plate 8 rotatably mounted by the links 9 and 9 is supported by the inner surface of the U-shaped seat frame 7. More specifically, the front end of the lid plate 8 is adapted to rest on and be supported by a bar extending between the front ends of the opposed side walls of the U-shaped seat frame 7, and also the lower surface of the rear end of the lid plate 8 is adapted to abut against and be supported by an inner inclined surface of the base wall of the U-shaped seat frame 7.

The supporting means for the lid plate 8 is not limited to the above construction and for example, projections (not shown) may be formed on lower portions of the opposed side walls of the seat frame 7 so as to engage and support the lower edges of the opposite side walls of the lid plate 8.

The operation of the pushcart of the above construction will now be described.

(1) Movement of lid plate 8 to its upstanding position

Figure 5:
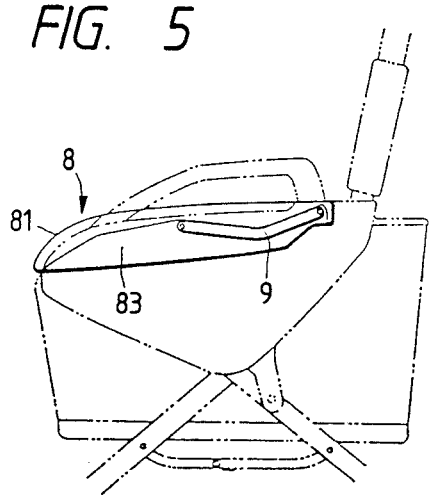
FIG. 5 is a side-elevational view showing the lid plate in its closed condition.

When purchased goods or articles are to be received in the article-holding container 6, the front end of the lid plate 8 disposed in its closed condition as shown in FIG. 5 is raised, so that the lid plate 8 is moved to its open position where the lid plate 8 is generally upstanding in contiguous relation to the front side of handle grip 5. As a result, the open top of the article-holding container 6 is fully opened. Thus, the lid plate 8 can be easily manipulated to be moved to its upstanding position as is the case with a conventional pushcart.

(2) Reversing movement of lid plate 8

Figure 6:
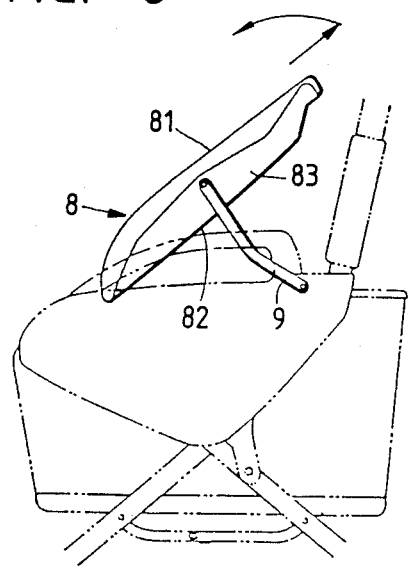
FIGS. 6 and 7 are side-elevational views showing the reversing operation of the lid plate.

When the lid plate 8 in its closed condition is to be reversed so that the reverse face thereof can be used as the seat surface 82, the rear end of the lid plate 8 in its closed condition is first raised along the front side of the handle grip 5 as shown in FIG. 6. Thus, this manipulation is carried out by raising the rear end of the lid plate 8 in contrast with the above manipulation to move the lid plate 8 to its upstanding position.

Figure 7:
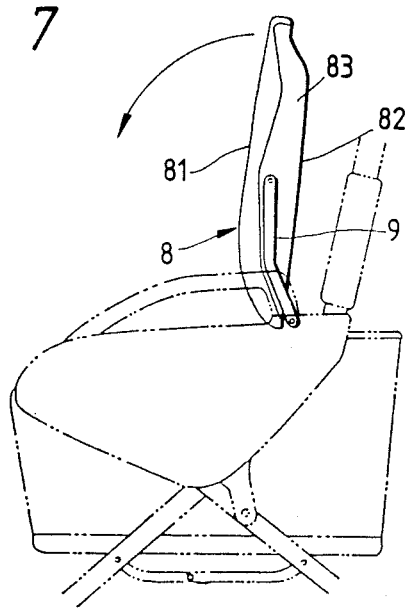
Figure 8:
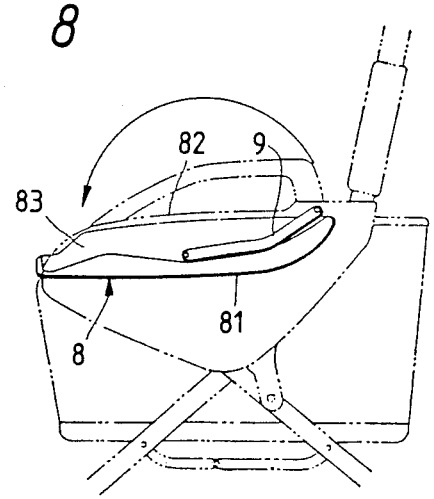
FIG. 8 is a side-elevational view showing the lid plate in its reversed condition to serve as the seat.

When the rear end of the lid plate 8 is thus raised to its highest level, the lid plate 8 is disposed in an upstanding position as shown in FIG. 7. Then, the lid plate 8 in this condition is brought down with its rear end directed in a direction indicated in an arrow in FIG. 7 (i.e., toward the front of the seat frame 7), the seat surface 82 which is the reverse face of the lid plate 8 is directed or exposed upwardly.

As a result, the forwardly-disposed end of the thus exposed seat surface 82 (which is the rear end of the lid plate 8 when the lid surface 81 is directed upwardly) rests on and is supported by the bar extending between the front ends of the opposed side walls of the seat frame 7. Also, the rearwardly-disposed end of the lid plate 8 (which is the front end of the lid plate 8 when the lid surface 81 is directed upwardly) abuts at its lower surface against the base wall of the U-shaped seat frame 7 and is supported thereby. Thus, the lid plate 8 is stably maintained in its supported position, so that the user can sit on the seat surface 82.

(3) Movement of lid plate 8 to its closed position

When the lid plate 8 is to be moved from its upstanding position to its closed position, this can be easily done merely by bringing down the upper end thereof forwardly in contrast with the above manipulation to move the lid plate 8 to its upstanding position.

When the lid plate 8 having the seat surface 82 exposed upwardly is to be moved to its closed position so that the lid surface 81 can close the open top of the article-holding container 6, the lid plate 8 is manipulated in contrast with the above manipulation (2). More specifically, the front end of the seat surface 82 is raised in a direction opposite to the direction of an arrow (FIG. B) so that the lid plate 8 is moved to the upstanding condition as shown in FIG. 7. Then the lower end of the lid plate 8 is pulled forwardly, so that the lid plate 8 can be easily brought into its closed position, with the lid surface 81 directed upwardly.

The following advantages can be achieved by the present invention:

(1) With respect to a conventional shopping pushcart having a seat surface exposed above an article-holding container, such a shopping pushcart tends to be regarded as a walking supportive device rather than as a shopping cart. Therefore, those who are healthy are reluctant to use it. In addition, since the lid plate is exposed, many limitations are imposed on the design of the pushcart.

In contrast, in the present invention, the lid plate 8, which can be moved into the upstanding position and be reversed or turned upside down to serve as both the seat surface 82 and the lid surface 81, is arranged above the article-holding container 6 inwardly of the seat frame 7. Therefore, when going shopping, the lid surface 81 is exposed, and the pushcart of the present invention can be used in the same manner as ordinary shopping pushcarts. Thus, the appearance is not marred at all. In addition, when the user who has difficulty in walking wishes to rest from walking, the seat surface 82 of the lid plate 8 is exposed so that he can sit on it.

(2) The opposite faces of the lid plate 8 can be used as the lid surface 81 and the seat surface 82, respectively, and the lid plate 8 can be reversed by the two links 9 and 9 each connected between the central portion of the side wall of the lid plate 8 and that portion of the side wall of the seat frame disposed adjacent to its base wall. With this construction, the lid plate 8 can be easily reversed to provide the seat on which the user can sit to take a rest, and also can be used as the lid for covering the open top of the article-holding container 6.

(3) The seat surface 82 has a shape suited for sitting purposes. Therefore, when the user sits on it, he does not feel fatigued and therefore can sit comfortably.

(4) The opposite faces of the lid plate 8 can be used as the lid surface 81 and the seat surface 82, and the lid surface 81 is exposed when going shopping and keeping the pushcart in the user's home. Therefore the seat surface 82 does not become dirty and can always be kept clean. Thus, this construction overcomes the problem that a seat surface of conventional pushcarts of this type becomes dirty or is damaged since such a seat surface is always exposed.

(5) The lid plate 8 can be moved to its upstanding position to open the open top of the article-holding container 6, and also can close an opening defined by the U-shaped seat frame 7 with the lid surface 81 directed upwardly. Further, the lid plate 8 can be used to provide a seat defined by the seat surface 82 disposed inwardly of the seat frame 7. These manipulations can be quite easily done as described above, and therefore even persons who have little mechanical knowledge can readily manipulate the pushcart.

What is claimed is:

1. A shopping pushcart comprising a frame constituting a body of said pushcart; an article-holding container mounted inwardly of said frame and having an open top; and a lid plate movably mounted through an angularly movable link means above the open top of said article-holding container such that said lid plate is movable to a generally upstanding position and is also reversible, opposite faces of said lid plate having shapes to serve as a lid surface for said container and a seat surface, respectively; further comprising a seat frame mounted on an upper portion of said article-holding container, said lid plate being mounted via said link means on said seat frame and disposed inwardly thereof, in which a side profile of said lid surface of said lid plate corresponds in contour to said seat frame, said seat surface having a front peripheral portion and being recessed relative to the contour of said seat frame except for said front peripheral portion of said seat surface to provide a suitable seat, and wherein said seat frame has a generally U-shape in a horizontal plane and comprises a pair of opposed side walls and a back wall interconnecting said side walls at the back of said pushcart, said opposed side walls serving as armrests when said lid plate has the seat surface positioned upward.

2. A shopping pushcart comprising a frame constituting a body of said pushcart; an article-holding container mounted inwardly of said frame and having an open top; and a lid plate movably mounted through an angularly movable link means above the open top of said article-holding container such that said lid plate is movable to a generally upstanding position and is also reversible, opposite faces of said lid plate having shapes to serve as a lid surface for said container and a seat surface, respectively; further comprising a seat frame mounted on an upper portion of said article-holding container, said lid plate being mounted via said link means on said seat frame and disposed inwardly thereof, and wherein said seat frame has a generally U-shape in a horizontal plane and comprises a pair of opposed side walls and back wall interconnecting said side walls at the back of said pushcart, said opposed side walls serving as armrests when said lid plate has the seat surface positioned upward.

3. A shopping pushcart according to any of claims 1 and 2, wherein said link means comprises two link arms; each said link arm being connected between a respective one of the opposite sides of said lid plate and said seat frame such that said lid plate is movable between its open and closed positions and is also reversible.

4. A shopping pushcart according to claim 3, wherein each said link arm is pivotally connected at one end to a central portion of a respective one of the opposite sides of said lid plate and is pivotally connected to the other end to said seat frame adjacent to a rear portion of said seat frame.

* * * * *